(12) United States Patent
Shaw

(10) Patent No.: US 6,976,563 B1
(45) Date of Patent: Dec. 20, 2005

(54) BRAKE CALIPER WITH INTEGRAL PARKING BRAKE

(75) Inventor: Schuyler S. Shaw, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/870,560

(22) Filed: Jun. 17, 2004

(51) Int. Cl.[7] .............................................. F16D 69/00
(52) U.S. Cl. ..................... 188/265; 188/163; 188/71.1; 303/89
(58) Field of Search ................................ 303/89, 3, 20, 303/15; 188/265, 71.7, 156–163

(56) References Cited

U.S. PATENT DOCUMENTS 5,253,736 A * 10/1993 Kohler ........................ 188/59

* cited by examiner

Primary Examiner—Matthew C. Graham
(74) Attorney, Agent, or Firm—Michael D. Smith

(57) ABSTRACT

A brake caliper with an integral parking brake. The brake caliper includes a housing having a bore with tapered walls, a piston having a rod mounted within the bore, a wedge element positioned between the rod and the tapered walls and displaceable to a locking position and a release position, a resilient element positioned to displace the wedge element to the release position, and a locking element for selectively displacing the wedge element to the locking position. When the locking element is momentarily actuated while a hydraulic pressure is present, the wedge element is urged to the locking position, thereby holding the brake caliper in a braking position when the hydraulic pressure is removed and then the locking element is de-actuated. A hydraulic pressure sufficient to cause the resilient element to urge the wedge element to the release position is effective to release the caliper.

20 Claims, 3 Drawing Sheets

BRAKE CALIPER WITH INTEGRAL PARKING BRAKE

FIELD

The present invention relates generally to brakes and, more particularly, to hydraulically actuated brakes having calipers and an integral parking brake.

BACKGROUND

Disc brake calipers are well known in the art of vehicle braking systems. In such systems, a master cylinder generates a hydraulic brake signal that is communicated to several brake actuators via brake lines. The signal drives a piston disposed within the caliper, which in turn forces an inboard brake pad into frictional engagement with a rotatable brake disc or "rotor." A reaction force is also generated, which causes the caliper to move inboard, drawing an outboard brake pad into frictional engagement with the rotor. Upon removal of the brake signal, the brake pads retract from the rotor to prevent frictional driving losses and undue wear on the braking components.

It is also known to utilize the brakes of a vehicle for both service and parking braking. Such brakes are typically actuated hydraulically when used for service braking. A separate mechanical actuation means is used to actuate the brakes for use as a parking brake. For example, a shaft or lever may be used to rotatably transmit a parking brake force to a clutch or cable that moves a piston to an extended, brake-engaging direction. Rotation of the lever in the opposite direction releases the clutch or cable and permits retraction of the piston.

Electrical actuation of a parking brake is also available in the art. In these systems an electric motor applies a force to a mechanical parking brake system by acting on either a drum or disc brake. Advantages of electrically-actuated parking brakes include ease of operation and consistent application of a predetermined amount of braking force. However, electrically-actuated parking brakes typically require large electric motor actuators that in turn require a relatively large amount of electrical power to actuate.

A particular problem with mechanical or electrical actuation of a hydraulic service brake for use as a parking brake occurs when a separate hydraulic pressure source is unable to supply adequate hydraulic pressure for applying and releasing the parking brake. Under such conditions, insufficient parking brake clamp force may be present to keep the vehicle from moving, particularly if the vehicle is parked on an incline.

There is a need for a hydraulic service brake that can provide sufficient clamp force for use as a parking brake under all vehicle operating conditions. There is a further need for a parking brake system that does not require a relatively large amount of electrical power to actuate.

SUMMARY

A brake caliper with an integral parking brake is disclosed according to an embodiment of the present invention. The brake caliper includes a housing having a bore with tapered walls, a piston having a rod mounted within the bore, a wedge element positioned between the rod and the tapered walls, a locking element for urging the wedge element to a locking position and a resilient element positioned to displace the wedge element to a release position. Accordingly, the piston rod may be locked in position relative to the housing, thereby serving as a parking brake, by actuation of the locking element, which displaces the wedge element to the locking position in which it jams between the piston rod and the tapered walls of the housing. The resilient element acts against the wedge element to hold it away from contact with the tapered walls in a release position until acted upon by the locking element.

In a preferred embodiment, the caliper includes a secondary piston. The primary and secondary pistons are acted on by the available hydraulic pressure, increasing the total clamp force of the caliper as compared with the force available from a single piston. With this arrangement, a cumulative clamp force is generated by the primary and secondary pistons as pressure is applied to the caliper. The parking brake is applied from a hydraulic pressure source and then electro-mechanically latched by a non-continuous electrical signal.

The wedge element preferably comprises a series of rollers rotatably mounted on a plunger or sleeve surrounding and slidably receiving the piston link, the locking element, an electromagnetic coil, and the release element. As the pistons traverse the bores of a caliper to engage the brake in response to hydraulic pressure, they move a hardened steel square piston link past the rollers. In this piston direction the rollers are allowed to rotate freely. To apply the parking brake, before the hydraulic pressure is released, the electromagnetic coil is energized, causing the plunger to be retracted and the rollers to engage the tapered walls such that the rollers become wedged between the piston link and the walls. The reaction force applied to the caliper by the pistons is thus maintained because the primary piston is held in place by the rollers, which are not able to rotate due to their wedged state. The electromagnetic coil can be de-energized after the rollers are wedged without affecting the clamping force of the brake.

To release the parking brake, a hydraulic pressure slightly greater than that originally applied to the pistons is applied. The increased pressure causes the pistons and the piston link to extend slightly, allowing the rollers of the locking assembly to disengage from their wedged state and rotate freely. The spring urges the rollers away from wedged engagement with the tapered walls. The freed pistons are allowed to retract into the caliper bore, relieving the caliper clamp force.

An object of the present invention is to provide a vehicle brake assembly of the type including a disc brake caliper positioned in relation to a rotor whereby friction pads are applied to opposite sides of the rotor when the brakes are applied.

Another object of the invention is to provide a method for operating a vehicle brake assembly of the type including a disc brake caliper positioned in relation to a rotor whereby friction pads are applied to opposite sides of the rotor when the brakes are applied.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
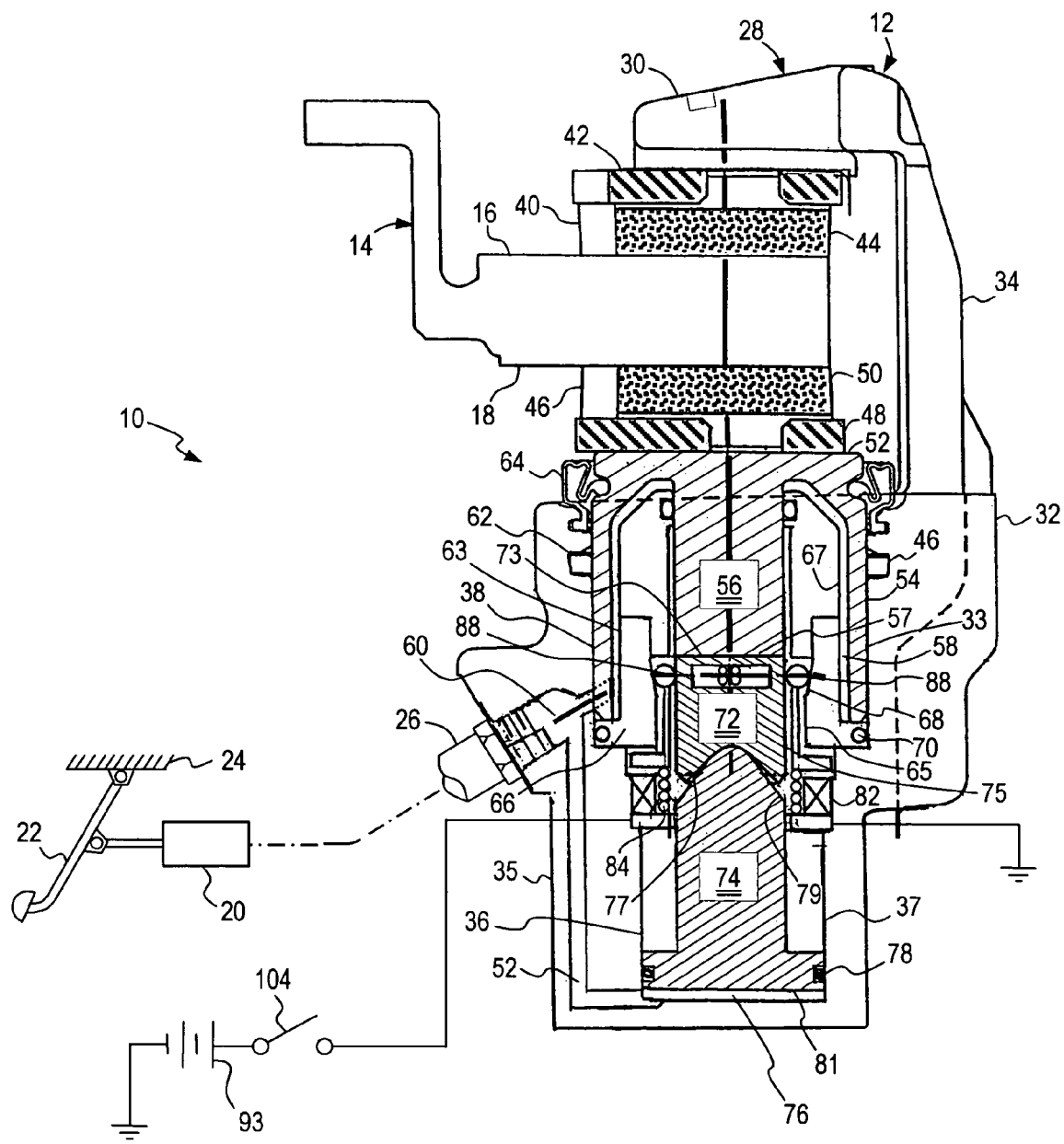
FIG. 1 is a side elevation in section of the general arrangement of a vehicle brake assembly according to an embodiment of the present invention.

With reference to FIG. 1, a vehicle brake assembly, generally designated 10, includes the caliper 12 of the present invention and a rotor 14 operatively secured to a vehicle wheel (not shown). Rotor 14 has first and second opposed friction braking surfaces 16 and 18, respectively. Caliper 12 is mounted on a vehicle by a suitable mounting bracket (not shown) so that it is slidably movable during brake engagement and release. The vehicle brake system is schematically illustrated in FIG. 1 as also including a master cylinder 20 actuated by a brake pedal 22 pivotally mounted on a vehicle 24. Master cylinder 20 is connected to caliper 12 by a conduit 26.

Caliper 12 includes a caliper body 28 formed to provide an outboard caliper leg 30, an inboard caliper leg 32 and a bridge section 34 joining the two caliper legs and extending over the outer periphery of rotor 14. Inboard caliper leg 32 is formed to generally define a cylinder 35 having a first bore 33 with an interior wall 38 and a second bore 37 with an interior wall 36. An open end of first bore 33 opens towards caliper outboard leg 30. One skilled in the art will recognize that first bore 33 and second bore 37 may be combined to form a single bore without departing from the scope of the invention.

An outboard brake shoe assembly 40, composed of a backing plate 42 and any conventional friction material known in the art, is formed to provide a friction pad 44 and is suitably mounted on outboard caliper leg 30 so that the friction pad may engage first disc friction braking surface 16 when the brake is actuated. Similarly, an inboard brake shoe assembly 46, composed of backing plate 48 and any conventional friction material known in the art, is formed to provide a friction pad 50. Friction pad 50 is suitably mounted to be engaged by a piston head 52 for movement with a primary piston 54 so that the friction pad engages disc friction braking surface 18 when brake assembly 10 is actuated. Likewise, friction pad 50 retracts with primary piston 54 when the brake is released. Inboard shoe assembly 46 engages piston head 52 to prevent rotation of primary piston 54 in the cylinder 36, in any manner known in the art.

Primary piston 54 is generally cylindrical and is disposed to reciprocate within wall 38 of first bore 33 with piston head 52 extending through the open end of the first bore and facing second disc friction braking surface 18. Primary piston 54 includes a piston rod portion 56 having a generally planar end 57. Primary piston 54 further includes a first pressure chamber 58 coupled to a fluid inlet 60. A suitable seal 62 and a boot 64 are provided to seal primary piston 54 and cylinder wall 38, and to prevent the entry of dust or other contaminants into the cylinder.

A stationary collar 66 is disposed in cylinder wall 38, generally coaxial to primary piston 54. Collar 66 comprises a generally cylindrical exterior surface 63 such that an interior cylindrical sidewall 67 of primary piston 54 is reciprocably slidable in relation to the collar. Collar 66 also includes a generally square or rectangular inner surface 65 having tapered walls 68. Collar 66, and particularly ramp 68, may be made of any suitable material, such as steel and sintered powdered metal, and may further be hardened by any conventional hardening process. A fluid seal 70 of collar 66 prevents ingress of brake fluid.

In an alternate embodiment of the present invention, stationary collar 66 may be eliminated, in which case tapered walls 68 are formed by tapering walls 38 of first bore 33 in any conventional manner, such as casting and machining.

A piston link 72 is disposed in cylinder wall 38 adjacent to primary piston 54 such that a generally planar first end 73 of the piston link contacts planar end 57 of piston rod 56 and is at least partially surrounded by a portion of the inner surface of collar 68. A plurality of side walls 75 of piston link 72 form a generally square or rectangular shape. A second, opposing end 77 of piston link 72 has a generally concave surface. Piston link 72 may be made of any suitable material, such as steel, and may be hardened by any conventional hardening process. In an alternate embodiment, piston link 72 may be attached to or made part of piston rod 56.

A secondary piston 74 may optionally be disposed to reciprocate adjacent to and in contact with the second end 77 of piston link 72 in cylinder wall 36 of second bore 37. A first end 79 of secondary piston 74 is convex in shape and is adapted to couple to the concave surface of end 77 of piston link 72. A second, opposing end 81 of secondary piston 74 is generally planar. A second pressure chamber 76 is delimited by the planar end 81 of secondary piston 74 and cylinder 36. A seal 78 prevents egress of fluid from second pressure chamber 76.

Secondary piston 74 is preferably not attached to piston rod 56, either directly or through piston link 72. This allows piston rod 56 and secondary piston 74 to have less influence on the alignment of piston link 72 as it passes through a locking assembly 80 (discussed below). In addition, the arrangement of secondary piston 74 as disclosed herein also makes the concentricity variation of the centerlines of first bore 33 and second bore 37 to be less critical with respect to each other for the alignment and installation of primary and secondary pistons 54, 74. However, one skilled in the art will recognize that secondary piston 74 and piston rod 56 may be attached directly or through piston link 72 without departing from the scope of the invention.

Figure 2:
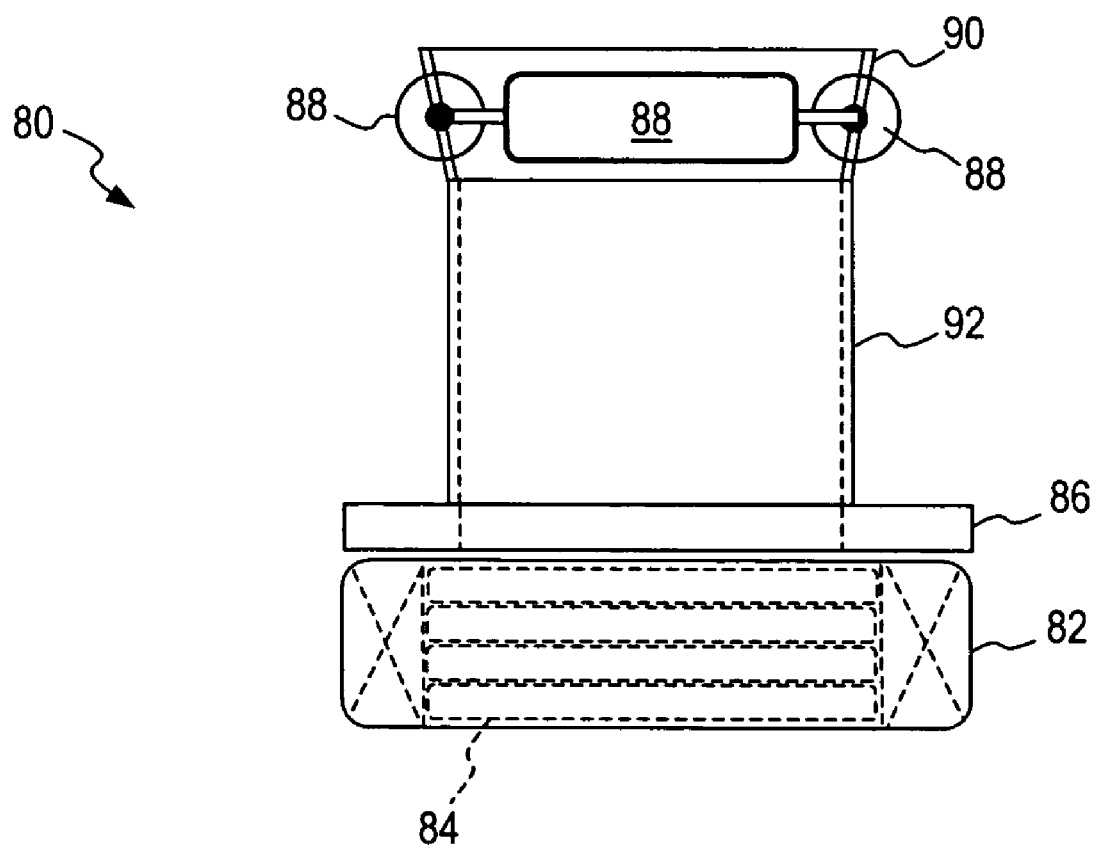
FIG. 2 is a side elevational view of a locking assembly of the assembly of FIG. 1.
Figure 3:
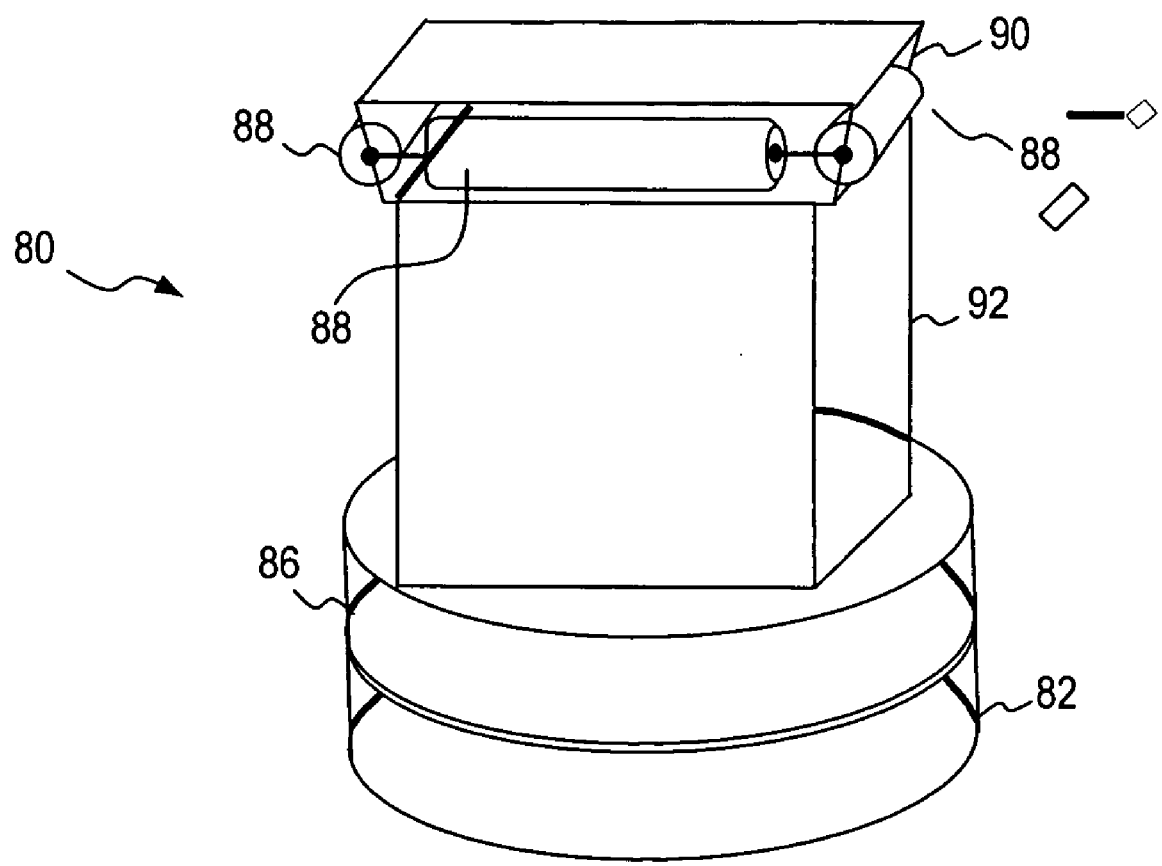
FIG. 3 is a perspective view of the locking assembly of FIG. 2.

With reference now to FIGS. 1–3 in combination, the caliper 12 includes a locking assembly 80. Locking assembly 80 comprises a locking element such as an electromagnetic coil 82, a compression spring 84, a plunger 86, and a wedge element in the form of a plurality of rollers 88 held in a generally square or rectangular shape and rotatably mounted on a separator 90. Plunger 86 may be made of any suitable material including, without limitation, ferrous material. Rollers 88 may be made of any suitable material, such as steel, and may be hardened by any conventional hardening process. Other forms of wedge elements, such as ball bearings and prism-shaped wedges, may be used without departing from the scope of the invention. A lower guide portion 92 of plunger 86 is generally square or rectangular, and is adapted to receive piston link 72. Spring 84 is preferably a helical type, though any conventional form of resilient element may be used including, without limitation, Belleville washers, leaf springs, compression springs, expansion springs and elastics.

Locking assembly 80 is disposed to reciprocate in cylinder wall 38 such that rollers 88 are positioned proximate ramp 68 of collar 66 and are in rolling contact with the side walls 75 of piston link 72, and lower guide portion 92 receives the piston link. Electromagnetic coil 82 is a conventional wound coil and is connected to a source 93 of electric power. Coil 82, when energized, creates a magnetic field that attracts plunger 86, compressing spring 84. When coil 82 is de-energized, spring 84 urges plunger 86 away from the coil.

As stated above, in alternate embodiments of the present invention other types of wedge elements may be used in place of locking assembly 80. For example, a wedge-shaped piece resembling separator 90 but lacking rollers 88 (see FIG. 2) may be positioned between piston rod 56 and ramp 68, and made displaceable between a locking position wherein the wedge-shaped piece engages the ramp and a release position wherein the wedge-shaped piece is positioned away from the ramp. A resilient element such as spring 84 may be positioned to displace the wedge-shaped piece to the release position while a locking element such as electromagnetic coil 82 selectively displaces the wedge-shaped piece to the locking position. The wedge-shaped piece may be made of any suitable material including, without limitation, ferrous material, and may optionally be hardened by any conventional hardening process. In other alternate embodiments the wedge-shaped piece may be plated or coated with a plastic or TEFLON material to aid the slidable movement of the piece.

Referring to FIG. 1, during service braking actuation, master cylinder 20 is actuated by depressing brake pedal 22 and a brake signal comprising brake fluid under pressure is delivered to fluid inlet 60 by means of brake conduit 26. The brake fluid is communicated to first and second pressure chambers 58, 76, respectively, acting against primary piston 54 and secondary piston 74 to extend the primary and secondary pistons. Movement of primary piston 54 is aided by secondary piston 74, which slidably urges piston link 72 against the planar end 57 of piston rod 56. With this arrangement, a cumulative extending force of primary piston 54 is generated by the primary piston and secondary piston 74. Piston head 52 and inboard brake shoe assembly 46 are in turn slidably urged toward rotor 14 until friction pad 50 engages second disc friction braking surface 18. Pressurization in first and second pressure chambers 58, 76 respectively, also causes caliper housing 28 to move in the opposite direction of inboard brake shoe assembly 46 to engage friction pad 44 of outboard brake shoe assembly 40 with first disc friction braking surface 16. The resulting friction between friction pad 50 and braking surface 18, and between friction pad 44 and braking surface 16, generates braking action in a well-known manner.

Upon release of the hydraulic pressure, the hydraulic signal is removed and the pressure in first and second pressure chambers 58, 76, respectively, is released. Primary piston 54 and secondary piston 74 slidably retract, actuated by seal 62 in a well-known manner. During retraction, primary piston 54, actuated by seal 62, slidably presses against piston link 72. Piston link 72 in turn slidably urges secondary piston 74 to move slidably to a retracted position.

Referring again to FIGS. 1–3, brake assembly 10 may additionally function as a parking brake. To engage the parking brake, an operator actuates a hydraulic pressure source such as brake pedal 22 and master cylinder 20. Sources of hydraulic pressure include, but are not limited to, an antilock braking system, traction control modulator, or central brake system, to generate a first hydraulic signal to actuate caliper 12 in the manner described above. While the first hydraulic signal is present to hold caliper 12 in the engaged position, the operator actuates a brake switch 104 that supplies electrical power from a source 93 (e.g., the vehicle battery) to electromagnetic coil 82, which causes plunger 86 to move toward the coil. The retracting movement of plunger 86 causes rollers 88 to displace along ramp 68 of collar 66, engaging the rollers in a wedge formed by the ramp and side walls 75 of piston link 72. The operator may then remove the first hydraulic signal. Caliper 12 remains engaged to rotor 14 because primary piston 54 remains in an extended position, prevented from retracting by piston link 72, which is in turn captively held by the wedged rollers 88. The operator may then remove power from coil 82. Rollers 88 will remain wedged in place due to the retracting force exerted on primary piston 54 by seal 62.

To release the parking brake, the operator again actuates a hydraulic pressure source, transmitting a second hydraulic signal to fluid inlet 60 by means of brake conduit 26. The second hydraulic signal preferably is at a slightly higher pressure as compared to the first hydraulic signal that was applied to engage the parking brake. The brake fluid is communicated to first and second pressure chambers 58, 76, acting against primary piston 54 and secondary piston 74. Primary piston 54 is slidably urged to a slightly greater extended position by the pressure of the brake fluid. Movement of primary piston 54 is aided by secondary piston 74, which slidably urges piston link 72 against planar end 57 of piston rod 56. The extending movement of primary piston 54, piston link 72, and secondary piston 74 acts to release rollers 88 from their wedged position. Spring 84, coupled between plunger 86 and cylinder 36, is free to expand, urging rollers 88 away from ramp 68. When the operator subsequently releases hydraulic pressure, removing the second hydraulic signal, primary piston 54, piston link 72 and secondary piston 74 are free to retract, urged by seal 62, causing caliper 12 to release rotor 14.

While this invention has been shown and described with respect to a detailed embodiment thereof, it will be understood by those skilled in the art that various changes in form and detail thereof may be made without departing from the scope of the claims of the invention.

What is claimed is:

1. A brake caliper comprising:
    a housing having a first bore with tapered walls;
    a primary piston having a piston rod, the piston and piston rod being mounted within the first bore and defining with the housing a first pressure chamber;
    a wedge element positioned between the piston rod and the tapered walls and being displaceable to a caliper locking position, wherein the wedge element engages the tapered walls and the piston rod to prevent relative movement between the piston and the tapered walls, and a caliper release position, wherein the wedge element permits relative movement between the piston and the tapered walls;
    a resilient element positioned to exert a force against the wedge element to displace the wedge element to the caliper release position; and
    an electromagnetic coil positioned to overcome the force of the resilient element and displace the wedge element to the caliper locking position when selectively energized, thereby preventing movement of the piston relative to the housing, and when not energized, to allow the resilient element to urge the wedge element to the caliper release position.

2. The brake caliper of claim 1, further comprising:
    a second bore; and
    a secondary piston mounted within the second bore and defining with the housing a second pressure chamber in fluid communication with the first pressure chamber;
    wherein the secondary piston is operatively coupled to the piston rod, and wherein the housing has only a single fluid inlet for connecting the first and second pressure chambers to a source of hydraulic pressure, so that the extending forces of the primary and secondary pistons are cumulative when the first and second pressure chambers are pressurized through the fluid inlet.

3. The brake caliper of claim 2, further comprising a piston link interposed between the piston rod and the secondary piston, whereby force is transmitted from the secondary piston to the piston rod.

4. The brake caliper of claim 1, wherein the housing includes a stationary collar mounted within the first bore and wherein the stationary collar includes the tapered walls.

5. The brake caliper of claim 1, wherein the wedge element includes a plurality of rollers.

6. The brake caliper of claim 1, wherein the resilient element is a spring.

7. A method for making a brake caliper, comprising the steps of:
  providing a housing having a first bore with tapered walls;
  mounting within the first bore a primary piston having a piston rod;
  positioning a wedge element between the piston rod and the tapered walls, the wedge element being displaceable to a caliper locking positions wherein the wedge element engages the tapered walls and the piston rod to prevent relative movement between the piston and the tapered walls, and a caliper release position, wherein the wedge element permits relative movement between the piston and the tapered walls;
  positioning a resilient element to exert a force upon the wedge element to displace the wedge element to the caliper release position; and
  providing an electromagnetic coil positioned to overcome the force of the resilient element and displace the wedge element to the caliper locking position when selectively energized, thereby preventing movement of the piston relative to the housing, and when not energized, to allow the resilient element to urge the wedge element to the caliper release position.

8. The method of claim 7, further comprising the steps of:
  providing a second bore; and
  mounting a secondary piston within the second bore and defining with the housing a second pressure chamber in fluid communication with the first pressure chamber;
  wherein the secondary piston is operatively coupled to the piston rod, and wherein the housing has only a single fluid inlet for connecting the first and second pressure chambers to a source of hydraulic pressure, so that the extending forces of the primary and secondary pistons are cumulative when the first and second pressure chambers are pressurized through the fluid inlet.

9. The method of claim 8, further comprising the step of positioning a piston link between the piston rod and the secondary piston to transmit force from the secondary piston to the piston rod.

10. The method of claim 7, further comprising the steps of:
  providing a stationary collar having the tapered walls; and
  mounting the stationary collar within the first bore.

11. The method of claim 7, further comprising the step of rotatably mounting a plurality of rollers to the wedge element.

12. The method of claim 7, wherein the resilient element is a spring.

13. A method for operating a brake caliper of the type having a housing with a first bore that includes tapered walls, a primary piston having a piston rod, the piston and the piston rod being mounted within the first bore, a wedge element positioned between the piston rod and the tapered walls and displaceable to a caliper locking position and a caliper release position, a resilient element for biasing the wedge element to the caliper release position, and an electromagnetic coil, comprising the steps of:
  providing a hydraulic pressure to the primary piston in the first bore to displace the primary piston therein to apply the brake caliper;
  energizing the electromagnetic coil, sufficient to displace the wedge element to the caliper locking position effective to maintain the primary piston in a displaced position, thereby maintaining application of the brake caliper; and
  removing the hydraulic pressure.

14. The method of claim 13, further comprising the steps of de-energizing the electromagnetic coil, thereby allowing the resilient element to bias the wedge element to the caliper release position, and providing a hydraulic pressure sufficient to cause the resilient element to urge the wedge element to the caliper release position.

15. A brake caliper comprising:
  a primary piston having a piston rod, the primary piston disposed to reciprocate within a bore of a housing and defining with the housing a first pressure chamber, the primary piston being actuatable by fluid pressure to extend the primary piston to apply a brake caliper;
  a stationary collar disposed within the bore and having tapered walls;
  a wedge element positioned between the piston rod and the tapered walls and displaceable to a caliper locking position, wherein the wedge element engages the tapered walls and the piston rod to prevent relative movement between the piston and the tapered walls, and a caliper release position, wherein the wedge element permits relative movement between the piston and the tapered walls;
  a resilient element positioned to displace the wedge element to the caliper release position; and
  an electromagnetic coil for selectively urging the wedge element to the caliper locking position,
  whereby when the electromagnetic coil is momentarily energized while the fluid pressure is present in the first pressure chamber, the wedge element is urged thereby to the caliper locking position, thereby holding the piston in an extended position when the fluid pressure is removed from the first pressure chamber and the electromagnetic coil is de-energized.

16. The brake caliper of claim 15, wherein when a hydraulic pressure is supplied to the primary piston sufficient to cause the primary piston to be further extended, and the electromagnetic coil is de-energized, the resilient element urges the wedge element to the caliper release position.

17. The brake caliper of claim 15, wherein the wedge elements include a plurality of rollers.

18. The brake caliper of claim 15, further comprising a secondary piston disposed to reciprocate within the bore and being actuatable by the hydraulic pressure to extend, thereby assisting the primary piston to apply the brake caliper.

19. The brake caliper of claim 18, further comprising a piston link disposed to reciprocate within the bore between the primary piston and the secondary piston.

20. The brake caliper of claim 15, wherein the resilient element is a spring.

* * * * *